United States Patent
Sivasubramanian et al.

(10) Patent No.: US 9,210,235 B2
(45) Date of Patent: *Dec. 8, 2015

(54) CLIENT SIDE CACHE MANAGEMENT

(71) Applicant: Amazon Technologies, Inc., Reno, NV (US)

(72) Inventors: Swaminathan Sivasubramanian, Seattle, WA (US); David R. Richardson, Seattle, WA (US); Bradley Eugene Marshall, Bainbridge Island, WA (US); Mauricio Alberto Uribe, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,387

(22) Filed: Aug. 28, 2013

(65) Prior Publication Data

US 2013/0346539 A1   Dec. 26, 2013

Related U.S. Application Data

(63) Continuation of application No. 12/060,202, filed on Mar. 31, 2008, now Pat. No. 8,533,293.

(51) Int. Cl.
*H04L 29/08* (2006.01)

(52) U.S. Cl.
CPC ........ *H04L 67/2842* (2013.01); *H04L 67/2847* (2013.01)

(58) Field of Classification Search
CPC .. H04L 67/2842; H04L 67/2847; G06F 15/16
See application file for complete search history.

(56) References Cited

U.S. PATENT DOCUMENTS

| 5,341,477 A | 8/1994 | Pitkin et al. |
| 5,611,049 A | 3/1997 | Pitts |

(Continued)

FOREIGN PATENT DOCUMENTS

| CN | 1422468 A | 6/2003 |
| CN | 1605182 A | 4/2005 |

(Continued)

OTHER PUBLICATIONS

Gunther et al, "Measuring Round Trip Times to determine the Distance between WLAN Nodes", Dec. 18, 2004, Technical University Berlin, all pages.

(Continued)

*Primary Examiner* — Michael C Lai
(74) *Attorney, Agent, or Firm* — Knobbe Martens Olson & Bear LLP

(57) ABSTRACT

A system, method and computer-readable medium for client-side cache management are provided. A client request for content is returned that includes executable code for generating a request for preload information. Based on processing the executable code, a client computing device requests preload information from a content delivery service provider. The content delivery service provider provides an identification of content based on resource requests previously served by the content delivery service provider. The client computing device processes the preload information and generates and obtains identified resources for maintenance in a client computing device memory, such as cache.

25 Claims, 7 Drawing Sheets

(56) References Cited

U.S. PATENT DOCUMENTS

| | | | |
|---|---|---|---|
| 5,701,467 | A | 12/1997 | Freeston |
| 5,774,660 | A | 6/1998 | Brendel et al. |
| 5,852,717 | A | 12/1998 | Bhide et al. |
| 5,892,914 | A | 4/1999 | Pitts |
| 5,893,116 | A | 4/1999 | Simmonds et al. |
| 5,933,811 | A | 8/1999 | Angles et al. |
| 5,974,454 | A | 10/1999 | Apfel et al. |
| 6,016,512 | A | 1/2000 | Huitema |
| 6,026,452 | A | 2/2000 | Pitts |
| 6,052,718 | A | 4/2000 | Gifford |
| 6,078,960 | A | 6/2000 | Ballard |
| 6,085,234 | A | 7/2000 | Pitts et al. |
| 6,098,096 | A | 8/2000 | Tsirigotis et al. |
| 6,108,703 | A | 8/2000 | Leighton et al. |
| 6,157,942 | A | 12/2000 | Chu et al. |
| 6,167,438 | A | 12/2000 | Yates et al. |
| 6,167,446 | A | 12/2000 | Lister et al. |
| 6,182,111 | B1 | 1/2001 | Inohara et al. |
| 6,182,125 | B1 | 1/2001 | Borella et al. |
| 6,185,598 | B1 | 2/2001 | Farber et al. |
| 6,192,051 | B1 | 2/2001 | Lipman et al. |
| 6,205,475 | B1 | 3/2001 | Pitts |
| 6,223,288 | B1 | 4/2001 | Angles et al. |
| 6,243,761 | B1 | 6/2001 | Mogul et al. |
| 6,275,496 | B1 | 8/2001 | Burns et al. |
| 6,286,043 | B1 | 9/2001 | Cuomo et al. |
| 6,286,084 | B1 | 9/2001 | Wexler et al. |
| 6,304,913 | B1 | 10/2001 | Rune |
| 6,345,308 | B1 | 2/2002 | Abe |
| 6,351,743 | B1 | 2/2002 | DeArdo et al. |
| 6,351,775 | B1 | 2/2002 | Yu |
| 6,363,411 | B1 | 3/2002 | Dugan et al. |
| 6,366,952 | B2 | 4/2002 | Pitts |
| 6,374,290 | B1 | 4/2002 | Scharber et al. |
| 6,377,257 | B1 | 4/2002 | Borrel et al. |
| 6,386,043 | B1 | 5/2002 | Millins |
| 6,405,252 | B1 | 6/2002 | Gupta et al. |
| 6,411,967 | B1 | 6/2002 | Van Renesse |
| 6,415,280 | B1 | 7/2002 | Farber et al. |
| 6,430,607 | B1 | 8/2002 | Kavner |
| 6,438,592 | B1 | 8/2002 | Killian |
| 6,452,925 | B1 | 9/2002 | Sistanizadeh et al. |
| 6,457,047 | B1 | 9/2002 | Chandra et al. |
| 6,459,909 | B1 | 10/2002 | Bilcliff et al. |
| 6,473,804 | B1 | 10/2002 | Kaiser et al. |
| 6,484,143 | B1 | 11/2002 | Swildens et al. |
| 6,505,241 | B2 | 1/2003 | Pitts |
| 6,523,036 | B1 | 2/2003 | Hickman et al. |
| 6,529,910 | B1 | 3/2003 | Fleskes |
| 6,529,953 | B1 | 3/2003 | Van Renesse |
| 6,553,413 | B1 | 4/2003 | Leighton et al. |
| 6,560,610 | B1 | 5/2003 | Eatherton et al. |
| 6,611,873 | B1 | 8/2003 | Kanehara |
| 6,643,357 | B2 | 11/2003 | Lumsden |
| 6,654,807 | B2 | 11/2003 | Farber et al. |
| 6,658,462 | B1 | 12/2003 | Dutta |
| 6,665,706 | B2 | 12/2003 | Kenner et al. |
| 6,678,791 | B1 | 1/2004 | Jacobs et al. |
| 6,681,282 | B1 | 1/2004 | Golden et al. |
| 6,694,358 | B1 | 2/2004 | Swildens et al. |
| 6,697,805 | B1 | 2/2004 | Choquier et al. |
| 6,724,770 | B1 | 4/2004 | Van Renesse |
| 6,732,237 | B1 | 5/2004 | Jacobs et al. |
| 6,754,699 | B2 | 6/2004 | Swildens et al. |
| 6,754,706 | B1 | 6/2004 | Swildens et al. |
| 6,760,721 | B1 | 7/2004 | Chasen et al. |
| 6,769,031 | B1 | 7/2004 | Bero |
| 6,782,398 | B1 | 8/2004 | Bahl |
| 6,785,704 | B1 | 8/2004 | McCanne |
| 6,795,434 | B1 | 9/2004 | Kumar et al. |
| 6,799,214 | B1 | 9/2004 | Li |
| 6,804,706 | B2 | 10/2004 | Pitts |
| 6,810,291 | B2 | 10/2004 | Card et al. |
| 6,810,411 | B1 | 10/2004 | Coughlin et al. |
| 6,829,654 | B1 | 12/2004 | Jungck |
| 6,862,607 | B1 | 3/2005 | Vermeulen |
| 6,874,017 | B1 | 3/2005 | Inoue et al. |
| 6,917,951 | B2 | 7/2005 | Orbits et al. |
| 6,928,467 | B2 | 8/2005 | Peng |
| 6,928,485 | B1 | 8/2005 | Krishnamurthy et al. |
| 6,941,562 | B2 | 9/2005 | Gao et al. |
| 6,963,850 | B1 | 11/2005 | Bezos et al. |
| 6,976,090 | B2 | 12/2005 | Ben-Shaul et al. |
| 6,981,017 | B1 | 12/2005 | Kasriel et al. |
| 6,985,945 | B2 | 1/2006 | Farhat et al. |
| 6,986,018 | B2 | 1/2006 | O'Rourke et al. |
| 6,990,526 | B1 | 1/2006 | Zhu |
| 6,996,616 | B1 | 2/2006 | Leighton et al. |
| 7,003,555 | B1 | 2/2006 | Jungck |
| 7,006,099 | B2 | 2/2006 | Gut et al. |
| 7,007,089 | B2 | 2/2006 | Freedman |
| 7,010,578 | B1 | 3/2006 | Lewin et al. |
| 7,010,598 | B2 | 3/2006 | Sitaraman et al. |
| 7,024,466 | B2 | 4/2006 | Outten et al. |
| 7,031,445 | B2 | 4/2006 | Lumsden |
| 7,032,010 | B1 | 4/2006 | Swildens et al. |
| 7,058,706 | B1 | 6/2006 | Iyer et al. |
| 7,058,953 | B2 | 6/2006 | Willard et al. |
| 7,065,587 | B2 | 6/2006 | Huitema et al. |
| 7,072,982 | B2 | 7/2006 | Teodosiu et al. |
| 7,076,633 | B2 | 7/2006 | Tormasov et al. |
| 7,082,476 | B1 | 7/2006 | Cohen et al. |
| 7,086,061 | B1 | 8/2006 | Joshi et al. |
| 7,092,505 | B2 | 8/2006 | Allison et al. |
| 7,092,997 | B1 | 8/2006 | Kasriel et al. |
| 7,096,266 | B2 | 8/2006 | Lewin et al. |
| 7,099,936 | B2 | 8/2006 | Chase et al. |
| 7,103,645 | B2 | 9/2006 | Leighton et al. |
| 7,114,160 | B2 | 9/2006 | Suryanarayana et al. |
| 7,117,262 | B2 | 10/2006 | Bai et al. |
| 7,133,905 | B2 | 11/2006 | Dilley et al. |
| 7,136,922 | B2 | 11/2006 | Sundaram et al. |
| 7,139,821 | B1 | 11/2006 | Shah et al. |
| 7,143,169 | B1 | 11/2006 | Champagne et al. |
| 7,143,170 | B2 | 11/2006 | Swildens et al. |
| 7,146,560 | B2 | 12/2006 | Dang et al. |
| 7,149,809 | B2 | 12/2006 | Barde et al. |
| 7,152,118 | B2 | 12/2006 | Anderson, IV et al. |
| 7,162,539 | B2 | 1/2007 | Garcie-Luna-Aceves |
| 7,174,382 | B2 | 2/2007 | Ramanathan et al. |
| 7,185,063 | B1 | 2/2007 | Kasriel et al. |
| 7,185,084 | B2 | 2/2007 | Sirivara et al. |
| 7,188,214 | B1 | 3/2007 | Kasriel et al. |
| 7,194,522 | B1 | 3/2007 | Swildens et al. |
| 7,200,667 | B2 | 4/2007 | Teodosiu et al. |
| 7,216,170 | B2 | 5/2007 | Danker et al. |
| 7,225,254 | B1 | 5/2007 | Swildens et al. |
| 7,228,350 | B2 | 6/2007 | Hong et al. |
| 7,228,359 | B1 | 6/2007 | Monteiro |
| 7,233,978 | B2 | 6/2007 | Overton et al. |
| 7,240,100 | B1 | 7/2007 | Wein et al. |
| 7,251,675 | B1 | 7/2007 | Kamakura et al. |
| 7,254,626 | B1 | 8/2007 | Kommula et al. |
| 7,254,636 | B1 | 8/2007 | O'Toole, Jr. et al. |
| 7,257,581 | B1 | 8/2007 | Steele et al. |
| 7,260,598 | B1 | 8/2007 | Liskov et al. |
| 7,260,639 | B2 | 8/2007 | Afergan et al. |
| 7,269,784 | B1 | 9/2007 | Kasriel et al. |
| 7,274,658 | B2 | 9/2007 | Bornstein et al. |
| 7,289,519 | B1 | 10/2007 | Liskov |
| 7,293,093 | B2 | 11/2007 | Leighton |
| 7,308,499 | B2 | 12/2007 | Chavez |
| 7,310,686 | B2 | 12/2007 | Uysal |
| 7,316,648 | B2 | 1/2008 | Kelly et al. |
| 7,320,131 | B1 | 1/2008 | O'Toole, Jr. |
| 7,321,918 | B2 * | 1/2008 | Burd et al. ............... 709/203 |
| 7,339,937 | B2 | 3/2008 | Mitra et al. |
| 7,363,291 | B1 | 4/2008 | Page |
| 7,363,626 | B2 | 4/2008 | Koutharapu et al. |
| 7,370,089 | B2 | 5/2008 | Boyd et al. |
| 7,373,416 | B2 | 5/2008 | Kagan et al. |
| 7,376,736 | B2 | 5/2008 | Sundaram et al. |
| 7,380,078 | B2 | 5/2008 | Ikegaya et al. |
| 7,392,236 | B2 | 6/2008 | Rusch et al. |

(56) References Cited

U.S. PATENT DOCUMENTS

| | | | |
|---|---|---|---|
| 7,398,301 | B2 | 7/2008 | Hennessey et al. |
| 7,406,512 | B2 | 7/2008 | Swildens et al. |
| 7,406,522 | B2 | 7/2008 | Riddle |
| 7,430,610 | B2 | 9/2008 | Pace et al. |
| 7,441,045 | B2 | 10/2008 | Skene et al. |
| 7,454,457 | B1 | 11/2008 | Lowery et al. |
| 7,454,500 | B1 | 11/2008 | Hsu et al. |
| 7,461,170 | B1 | 12/2008 | Taylor et al. |
| 7,464,142 | B2 | 12/2008 | Flurry et al. |
| 7,478,148 | B2 | 1/2009 | Neerdaels |
| 7,492,720 | B2 | 2/2009 | Pruthi et al. |
| 7,496,651 | B1 | 2/2009 | Joshi |
| 7,499,998 | B2 | 3/2009 | Toebes et al. |
| 7,502,836 | B1 | 3/2009 | Menditto et al. |
| 7,519,720 | B2 | 4/2009 | Fishman et al. |
| 7,519,726 | B2 | 4/2009 | Palliyil et al. |
| 7,523,181 | B2 | 4/2009 | Swildens et al. |
| 7,543,024 | B2 | 6/2009 | Holstege |
| 7,548,947 | B2 | 6/2009 | Kasriel et al. |
| 7,552,235 | B2 | 6/2009 | Chase et al. |
| 7,555,542 | B1 | 6/2009 | Ayers et al. |
| 7,561,571 | B1 | 7/2009 | Lovett et al. |
| 7,565,407 | B1 | 7/2009 | Hayball |
| 7,568,032 | B2 | 7/2009 | Feng et al. |
| 7,573,916 | B1 | 8/2009 | Bechtolsheim et al. |
| 7,574,499 | B1 | 8/2009 | Swildens et al. |
| 7,581,009 | B1 | 8/2009 | Hsu et al. |
| 7,594,189 | B1 | 9/2009 | Walker et al. |
| 7,596,619 | B2 | 9/2009 | Leighton et al. |
| 7,617,222 | B2 | 11/2009 | Coulthard et al. |
| 7,623,460 | B2 | 11/2009 | Miyazaki |
| 7,624,169 | B2 | 11/2009 | Lisiecki et al. |
| 7,631,101 | B2 | 12/2009 | Sullivan et al. |
| 7,640,296 | B2 | 12/2009 | Fuchs et al. |
| 7,650,376 | B1 | 1/2010 | Blumenau |
| 7,653,700 | B1 | 1/2010 | Bahl et al. |
| 7,653,725 | B2 | 1/2010 | Yahiro et al. |
| 7,657,613 | B1 | 2/2010 | Hanson et al. |
| 7,657,622 | B1 | 2/2010 | Douglis et al. |
| 7,661,027 | B2 | 2/2010 | Langen et al. |
| 7,664,879 | B2 | 2/2010 | Chan et al. |
| 7,676,570 | B2 | 3/2010 | Levy et al. |
| 7,680,897 | B1 | 3/2010 | Carter et al. |
| 7,685,251 | B2 | 3/2010 | Houlihan et al. |
| 7,693,813 | B1 | 4/2010 | Cao et al. |
| 7,702,724 | B1 | 4/2010 | Brydon et al. |
| 7,706,740 | B2 | 4/2010 | Collins et al. |
| 7,707,314 | B2 | 4/2010 | McCarthy et al. |
| 7,711,647 | B2 | 5/2010 | Gunaseelan et al. |
| 7,711,788 | B2 | 5/2010 | Lev Ran et al. |
| 7,716,367 | B1 | 5/2010 | Leighton et al. |
| 7,725,602 | B2 | 5/2010 | Liu et al. |
| 7,730,187 | B2 | 6/2010 | Raciborski et al. |
| 7,739,400 | B2 | 6/2010 | Lindbo et al. |
| 7,747,720 | B2 | 6/2010 | Toebes et al. |
| 7,756,913 | B1 | 7/2010 | Day |
| 7,756,965 | B2 | 7/2010 | Joshi |
| 7,757,202 | B2 | 7/2010 | Dahlsted et al. |
| 7,761,572 | B1 | 7/2010 | Auerbach |
| 7,765,304 | B2 | 7/2010 | Davis et al. |
| 7,769,823 | B2 | 8/2010 | Jenny et al. |
| 7,773,596 | B1 | 8/2010 | Marques |
| 7,774,342 | B1 | 8/2010 | Virdy |
| 7,787,380 | B1 | 8/2010 | Aggarwal et al. |
| 7,792,989 | B2 | 9/2010 | Toebes et al. |
| 7,809,597 | B2 | 10/2010 | Das et al. |
| 7,813,308 | B2 | 10/2010 | Reddy et al. |
| 7,814,229 | B1 | 10/2010 | Cabrera et al. |
| 7,818,454 | B2 | 10/2010 | Kim et al. |
| 7,827,256 | B2 | 11/2010 | Phillips et al. |
| 7,836,177 | B2 | 11/2010 | Kasriel et al. |
| 7,873,065 | B1 | 1/2011 | Mukerji et al. |
| 7,890,612 | B2 | 2/2011 | Todd et al. |
| 7,899,899 | B2 | 3/2011 | Joshi |
| 7,904,875 | B2 | 3/2011 | Hegyi |
| 7,912,921 | B2 | 3/2011 | O'Rourke et al. |
| 7,925,782 | B2 | 4/2011 | Sivasubramanian et al. |
| 7,930,393 | B1 | 4/2011 | Baumback et al. |
| 7,930,402 | B2 | 4/2011 | Swildens et al. |
| 7,930,427 | B2 | 4/2011 | Josefsberg et al. |
| 7,933,988 | B2 | 4/2011 | Nasuto et al. |
| 7,937,477 | B1 | 5/2011 | Day et al. |
| 7,945,693 | B2 | 5/2011 | Farber et al. |
| 7,949,779 | B2 | 5/2011 | Farber et al. |
| 7,958,222 | B1 | 6/2011 | Pruitt et al. |
| 7,958,258 | B2 | 6/2011 | Yeung et al. |
| 7,962,597 | B2 | 6/2011 | Richardson et al. |
| 7,966,404 | B2 | 6/2011 | Hedin et al. |
| 7,970,816 | B2 | 6/2011 | Chess et al. |
| 7,970,940 | B1 | 6/2011 | van de Ven et al. |
| 7,979,509 | B1 | 7/2011 | Malmskog et al. |
| 7,991,910 | B2 | 8/2011 | Richardson et al. |
| 7,996,533 | B2 | 8/2011 | Leighton et al. |
| 7,996,535 | B2 | 8/2011 | Auerbach |
| 8,000,724 | B1 | 8/2011 | Rayburn et al. |
| 8,010,707 | B2 | 8/2011 | Elzur et al. |
| 8,024,441 | B2 | 9/2011 | Kommula et al. |
| 8,028,090 | B2 | 9/2011 | Richardson et al. |
| 8,041,773 | B2 | 10/2011 | Abu-Ghazaleh et al. |
| 8,041,809 | B2 | 10/2011 | Sundaram et al. |
| 8,041,818 | B2 | 10/2011 | Gupta et al. |
| 8,065,275 | B2 | 11/2011 | Eriksen et al. |
| 8,069,231 | B2 | 11/2011 | Schran et al. |
| 8,073,940 | B1 | 12/2011 | Richardson et al. |
| 8,082,348 | B1 | 12/2011 | Averbuj et al. |
| 8,108,623 | B2 | 1/2012 | Krishnaprasad et al. |
| 8,117,306 | B1 | 2/2012 | Baumback et al. |
| 8,122,098 | B1 | 2/2012 | Richardson et al. |
| 8,122,124 | B1 | 2/2012 | Baumback et al. |
| 8,135,820 | B2 | 3/2012 | Richardson et al. |
| 8,156,243 | B2 | 4/2012 | Richardson et al. |
| 8,190,682 | B2 | 5/2012 | Paterson-Jones et al. |
| 8,195,837 | B2 | 6/2012 | McCarthy et al. |
| 8,224,986 | B1 | 7/2012 | Liskov et al. |
| 8,234,403 | B2 | 7/2012 | Richardson et al. |
| 8,239,530 | B2 | 8/2012 | Sundaram et al. |
| 8,250,211 | B2 | 8/2012 | Swildens et al. |
| 8,250,219 | B2 | 8/2012 | Raciborski et al. |
| 8,266,288 | B2 | 9/2012 | Banerjee et al. |
| 8,266,327 | B2 | 9/2012 | Kumar et al. |
| 8,280,998 | B2 | 10/2012 | Joshi |
| 8,281,035 | B2 | 10/2012 | Farber et al. |
| 8,291,046 | B2 | 10/2012 | Farber et al. |
| 8,291,117 | B1 | 10/2012 | Eggleston et al. |
| 8,301,645 | B1 | 10/2012 | Crook |
| 8,321,568 | B2 | 11/2012 | Sivasubramanian et al. |
| 8,402,137 | B2 | 3/2013 | Sivasubramanian et al. |
| 8,433,749 | B2 | 4/2013 | Wee et al. |
| 8,447,876 | B2 | 5/2013 | Verma et al. |
| 8,452,874 | B2 | 5/2013 | MacCarthaigh et al. |
| 8,463,877 | B1 | 6/2013 | Richardson |
| 8,468,222 | B2 | 6/2013 | Sakata et al. |
| 8,468,245 | B2 | 6/2013 | Farber et al. |
| 8,473,613 | B2 | 6/2013 | Farber et al. |
| 8,478,903 | B2 | 7/2013 | Farber et al. |
| 8,504,721 | B2 | 8/2013 | Hsu et al. |
| 8,510,428 | B2 | 8/2013 | Joshi |
| 8,510,807 | B1 | 8/2013 | Elazary et al. |
| 8,521,851 | B1 | 8/2013 | Richardson et al. |
| 8,521,908 | B2 | 8/2013 | Holmes et al. |
| 8,526,405 | B2 | 9/2013 | Curtis et al. |
| 8,527,658 | B2 | 9/2013 | Holmes et al. |
| 8,572,208 | B2 | 10/2013 | Farber et al. |
| 8,572,210 | B2 | 10/2013 | Farber et al. |
| 8,577,992 | B1 | 11/2013 | Richardson et al. |
| 8,589,996 | B2 | 11/2013 | Ma et al. |
| 8,606,996 | B2 | 12/2013 | Richardson et al. |
| 8,615,549 | B2 | 12/2013 | Knowles et al. |
| 8,626,950 | B1 | 1/2014 | Richardson et al. |
| 8,639,817 | B2 | 1/2014 | Sivasubramanian et al. |
| 8,645,539 | B2 | 2/2014 | McCarthy et al. |
| 8,676,918 | B2 | 3/2014 | Richardson et al. |
| 8,683,076 | B2 | 3/2014 | Farber et al. |
| 8,688,837 | B1 | 4/2014 | Richardson et al. |

(56) References Cited

U.S. PATENT DOCUMENTS

| | | |
|---|---|---|
| 8,732,309 B1 | 5/2014 | Richardson et al. |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 9,003,035 B1 | 4/2015 | Richardson et al. |
| 9,009,286 B2 | 4/2015 | Sivasubramanian et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 2001/0000811 A1 | 5/2001 | May et al. |
| 2001/0025305 A1 | 9/2001 | Yoshiasa |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1* | 6/2002 | Dusse ............... 455/419 |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1* | 7/2002 | Janniello et al. ............ 725/86 |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1* | 10/2002 | Croman et al. ............ 709/235 |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1* | 8/2003 | Chaudhri et al. ............ 705/1 |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010563 A1 | 1/2004 | Forte et al. |
| 2004/0010621 A1 | 1/2004 | Afergan et al. |
| 2004/0019518 A1 | 1/2004 | Abraham et al. |
| 2004/0024841 A1* | 2/2004 | Becker et al. ............ 709/219 |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1* | 12/2004 | Truty ............... 709/219 |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0117717 A1 | 6/2005 | Lumsden |

(56) References Cited

U.S. PATENT DOCUMENTS

| | | |
|---|---|---|
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0168088 A1 | 7/2006 | Leighton et al. |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218256 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1* | 2/2008 | Afergan et al. ............... 709/247 |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |

(56) References Cited

U.S. PATENT DOCUMENTS

| | | |
|---|---|---|
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1* | 8/2008 | Souders et al. ............... 707/10 |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang et al. |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1* | 10/2009 | Richardson et al. .......... 709/239 |
| 2009/0249222 A1 | 10/2009 | Schmidt et al. |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1* | 12/2009 | Igarashi ....................... 709/203 |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0274765 A1 | 10/2010 | Murphy et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0036238 A1 | 2/2012 | Sundaram et al. |
| 2012/0066360 A1 | 3/2012 | Ghosh |
| 2012/0089972 A1 | 4/2012 | Scheidel et al. |

(56) References Cited

U.S. PATENT DOCUMENTS

| | | | |
|---|---|---|---|
| 2012/0096065 | A1 | 4/2012 | Suit et al. |
| 2012/0124184 | A1 | 5/2012 | Sakata et al. |
| 2012/0131177 | A1 | 5/2012 | Brandt et al. |
| 2012/0136697 | A1 | 5/2012 | Peles et al. |
| 2012/0166516 | A1 | 6/2012 | Simmons et al. |
| 2012/0169646 | A1 | 7/2012 | Berkes et al. |
| 2012/0173760 | A1 | 7/2012 | Jog et al. |
| 2012/0179817 | A1 | 7/2012 | Bade et al. |
| 2012/0179839 | A1 | 7/2012 | Raciborski et al. |
| 2012/0198043 | A1 | 8/2012 | Hesketh et al. |
| 2012/0233522 | A1 | 9/2012 | Barton et al. |
| 2012/0233668 | A1 | 9/2012 | Leafe et al. |
| 2012/0303804 | A1 | 11/2012 | Sundaram et al. |
| 2012/0311648 | A1 | 12/2012 | Swildens et al. |
| 2012/0324089 | A1 | 12/2012 | Joshi |
| 2013/0003735 | A1 | 1/2013 | Chao et al. |
| 2013/0019311 | A1 | 1/2013 | Swildens et al. |
| 2013/0041872 | A1 | 2/2013 | Aizman et al. |
| 2013/0086001 | A1 | 4/2013 | Bhogal et al. |
| 2013/0130221 | A1 | 5/2013 | Kortemeyer et al. |
| 2013/0151646 | A1 | 6/2013 | Chidambaram et al. |
| 2013/0198341 | A1 | 8/2013 | Kim |
| 2013/0212300 | A1 | 8/2013 | Eggleston et al. |
| 2013/0227165 | A1 | 8/2013 | Liu |
| 2013/0246567 | A1 | 9/2013 | Green et al. |
| 2013/0268616 | A1 | 10/2013 | Sakata et al. |
| 2013/0311605 | A1 | 11/2013 | Richardson et al. |
| 2013/0318153 | A1 | 11/2013 | Sivasubramanian et al. |
| 2013/0339429 | A1 | 12/2013 | Richardson et al. |
| 2013/0346567 | A1 | 12/2013 | Richardson et al. |
| 2014/0040478 | A1 | 2/2014 | Hsu et al. |
| 2014/0075109 | A1 | 3/2014 | Richardson et al. |
| 2014/0143320 | A1 | 5/2014 | Sivasubramanian et al. |
| 2014/0257891 | A1 | 9/2014 | Richardson et al. |
| 2014/0297870 | A1 | 10/2014 | Eggleston et al. |
| 2014/0325155 | A1 | 10/2014 | Marshall et al. |
| 2014/0365666 | A1 | 12/2014 | Richardson et al. |
| 2015/0081842 | A1 | 3/2015 | Richardson et al. |

FOREIGN PATENT DOCUMENTS

| | | |
|---|---|---|
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| JP | 2001-0506093 | 5/2001 |
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2010/002603 A1 | 1/2010 |
| WO | WO 2012/044587 A1 | 4/2012 |

OTHER PUBLICATIONS

Examination Report in Singapore Application No. 201006874-0 dated May 16, 2012.
Second Office Action in Japanese Application No. 2011-516466 mailed Mar. 17, 2014.
Preliminary Examination in Chinese Application No. 201310717573.1 dated Feb. 25, 2014. English Translation Not Yet Received.
Office Action in Japanese Application No. 2013-540982 dated Jun. 2, 2014 English Translation Not Yet Received.
Written Opinion in Singapore Application No. 201303521-7 dated May 20, 2014.
Office Action in Japanese Application No. 2013-123086 mailed Apr. 15, 2014 in 3 pages.
Third Office Action in Chinese Application No. 200980111426.1 mailed Jul. 7, 2014.
Decision of Rejection in Application No. 2011-502139 dated Jun. 30, 2014.
First Office Action in Japanese Application No. 2011-503091 dated Nov. 18, 2013.
Search Report and Written Opinion issued in Singapore Application No. 201006873-2 mailed on Oct. 12, 2011.
Search Report and Written Opinion in Singapore Application No. 201301573-0 mailed Jul. 1, 2014.
First Office Action in Chinese Application No. 200980111422.3 dated Apr. 13, 2012.
Second Office Action in Chinese Application No. 200980111426.1 mailed Dec. 25, 2013.
First Office Action in Japanese Application No. 2011-502139 dated Nov. 5, 2013.
First Office Action in Japanese Application No. 2013-529454 mailed Feb. 3, 2014 in 6 pages.
First Office Action issued in Australian Application No. 2011307319 mailed Mar. 6, 2014 in 5 pages.
Office Action in Indian Application No. 3742/KOLNP/2008 dated Nov. 22, 2013.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.

(56) References Cited

OTHER PUBLICATIONS

Baglioni et al., "Preprocessing and Mining Web Log Data for Web Personalization", LNAI 2829, 2003, pp. 237-249.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Chipara et al, "Realtime Power-Aware Routing in Sensor Network", IEEE, 2006, 10 pages.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

Examination Report in Singapore Application No. 201103333-9 dated Aug. 13, 2013.

First Office Action in Chinese Application No. 200980111426.1 mailed Feb. 16, 2013.

First Office Action in Chinese Application No. 200980119993.1 dated Jul. 4, 2012.

First Office Action in Chinese Application No. 200980119995.0 dated Jul. 6, 2012.

First Office Action in Chinese Application No. 200980145872.4 dated Nov. 29, 2012.

Gruener, J., "A Vision of Togetherness," May 24, 2004, NetworkWorld, retrieved May 3, 2006, from, http://www.networkworld.com/supp/2004/ndc3/0524virt.html, 9 pages.

International Preliminary Report on Patentability in PCT/US2007/007601 mailed Sep. 30, 2008 in 8 pages.

International Preliminary Report on Patentability in PCT/US2011/053302 mailed Apr. 2, 2013.

International Preliminary Report on Patentability in PCT/US2011/061486 mailed May 22, 2013.

International Search Report and Written Opinion in PCT/US07/07601 mailed Jul. 18, 2008 in 11 pages.

International Search Report and Written Opinion in PCT/US2011/053302 mailed Nov. 28, 2011 in 11 pages.

International Search Report and Written Opinion in PCT/US2011/061486 mailed Mar. 30, 2012 in 11 pages.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kenshi, P., "Help File Library: Iptables Basics," Justlinux, retrieved Dec. 1, 2005, from http://www.justlinux.com/nhf/Security/Iptables_Basics.html, 4 pages.

Liu et al., "Combined mining of Web server logs and web contents for classifying user navigation patterns and predicting users' future requests," Data & Knowledge Engineering 61 (2007) pp. 304-330.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Office Action in Canadian Application No. 2726915 dated May 13, 2013.

Office Action in Canadian Application No. 2741895 dated Oct. 21, 2013.

Office Action in Canadian Application No. 2741895 dated Feb. 25, 2013.

Office Action in Chinese Application No. 200780020255.2 dated Mar. 4, 2013.

Office Action in Chinese Application No. 200980119993.1 dated Oct. 21, 2013.

Office Action in Chinese Application No. 200980119995.0 dated Apr. 15, 2013.

Office Action in Japanese Application No. 2011-502138 mailed Feb. 1, 2013.

Office Action in Japanese Application No. 2011-502140 mailed Dec. 7, 2012.

Office Action in Japanese Application No. 2011-516466 mailed Mar. 6, 2013.

Office Action in Japanese Application No. 2012-052264 mailed Dec. 11, 2012 in 26 pages.

Office Action in Korean Application No. 10-2011-7002461 mailed May 29, 2013.

Preliminary Examination in Chinese Application No. 201180053405.6 dated May 28, 2013. English Translation Not Yet Received.

Search Report and Written Opinion in Singapore Application No. 201103333-9 mailed Nov. 19, 2012.

Second Office Action in Chinese Application No. 200980119993.1 dated Mar. 12, 2013.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Singapore Examination Report in Application No. 201006837-7 mailed May 16, 2012.

Singapore Written Opinion in Application No. 201006836-9, mailed Apr. 30, 2012 in 10 pages.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Supplementary European Search Report in Application No. 07754164.7 mailed Dec. 20, 2010 in 7 pages.

Supplementary European Search Report in Application No. 09727694.3 mailed Jan. 30, 2012 in 6 pages.

Supplementary European Search Report in Application No. 09728756.9 mailed Jan. 8, 2013.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

(56) References Cited

OTHER PUBLICATIONS

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://wvvvv.hpl.hp.com/techreports/2005/HPL-2005-193R1.pdf, 9 pages.
First Office Action is Chinese Application No. 200980125551.8 mailed Jul. 4, 2012.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=6010099 70, XP055153445, Mar. 24, 2008.
First Office Action in Chinese Application No. 201180046104.0 mailed Nov. 3, 2014.
Gunther et al, "Measuring Round Trip Times to determine the Distance between WLAN Nodes",May2005, In Proc. Of Networking 2005, all pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114-123 (No Eng Trans).
Supplementary European Search Report in Application No. 09729072.0 2266064 dated Dec. 10, 2014.
Fourth Office Action in Chinese Application No. 200980111426.1 mailed Jan. 15, 2015.
Decision of Refusal in Japanese Application No. 2011-516466 mailed Jan. 16, 2015.
Examination Report in Singapore Application No. 201301573-0 mailed Dec. 22, 2014.
Office Action in Japanese Application No. 2013-529454 dated Mar. 9, 2015 (Eng Translation Not Yet Received).
Office Action in Japanese Application No. 2013-123086 mailed Dec. 2, 2014 in 2 pages.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
First Office Action in Chinese Application No. 201180053405.6 dated May 3, 2015.

\* cited by examiner

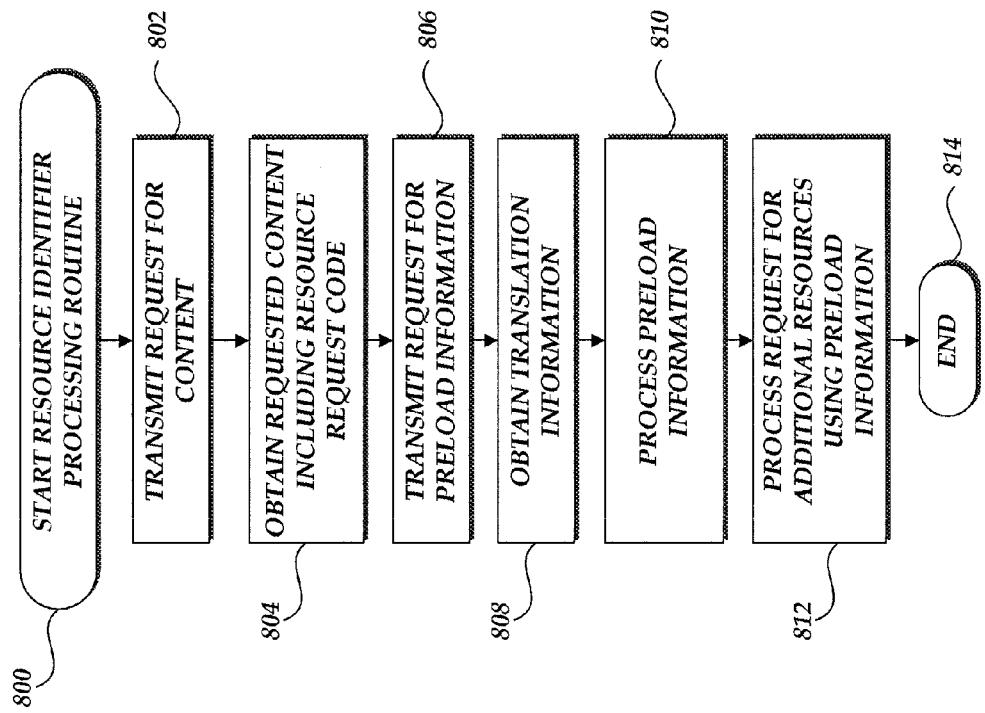

CLIENT SIDE CACHE MANAGEMENT

CROSS REFERENCE TO RELATED APPLICATIONS

This application is a continuation of U.S. patent application Ser. No. 12/060,202, filed Mar. 31, 2008, now U.S. Pat. No. 8,533,293, entitled "CLIENT SIDE CACHE MANAGEMENT," the disclosure of which is incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a flow diagram illustrative of a resource preload processing routine implemented by a client computing device based on preload information provided by a content delivery network service provider.

DETAILED DESCRIPTION

Generally described, the present disclosure is directed to the management of resource identifiers utilized by a client computing device to request content from a network resource, such as content delivery network ("CDN") service providers. Specifically, aspects of the disclosure will be described with regard to the processing, by a client computing device, of a list of resource identifiers provided by the CDN service provider to facilitate the access to such resources by the client computing device. In one embodiment, at least some portion of the identified resources may be preloaded to a client computing device memory to provide access to the resource in advance of the need to generate a request. Although various aspects of the disclosure will be described with regard to illustrative examples and embodiments, one skilled in the art will appreciate that the disclosed embodiments and examples should not be construed as limiting.

Figure 1:
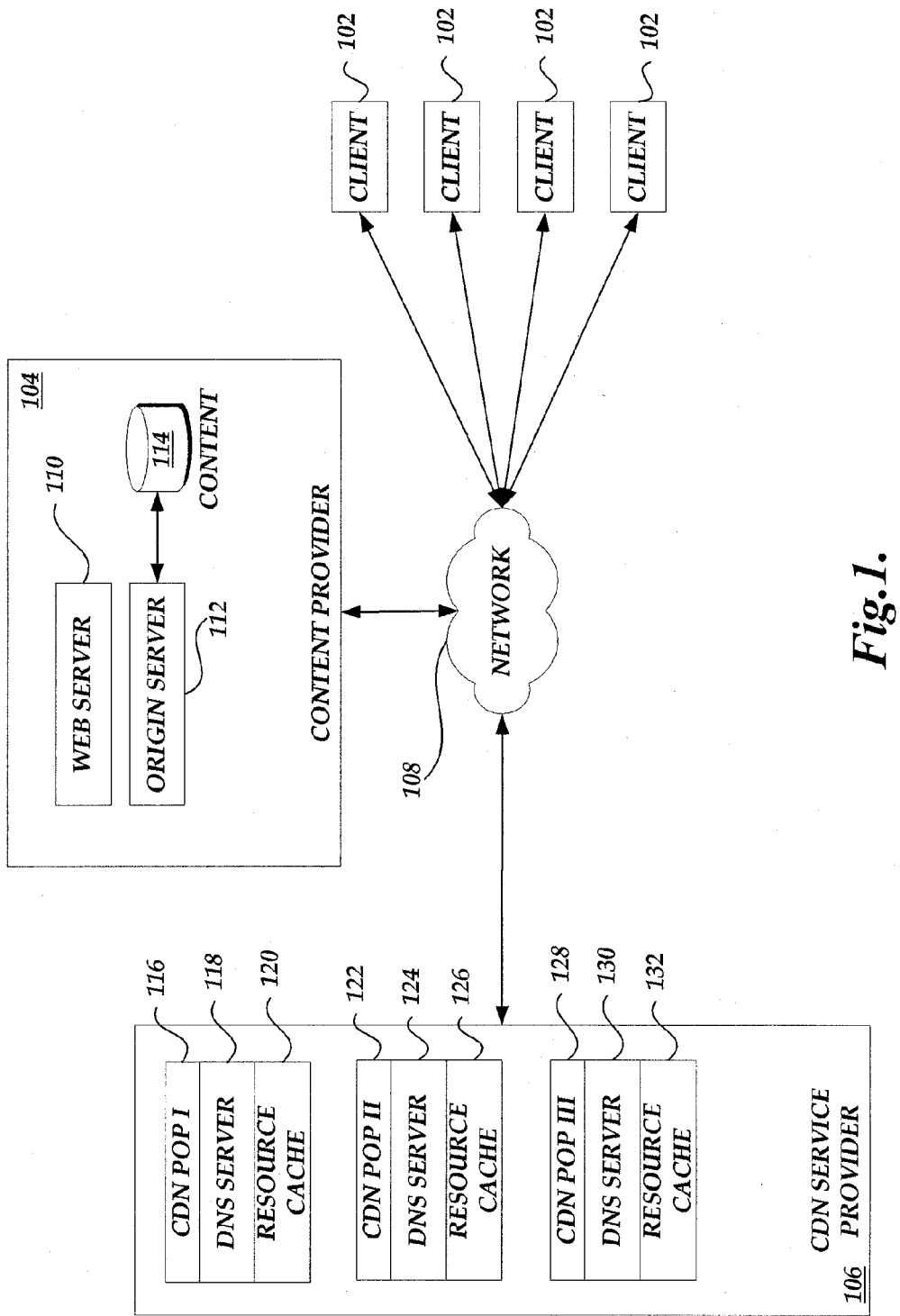
FIG. 1 is a block diagram illustrative of content delivery environment including a number of client computing devices, a content provider, and a content delivery network service provider.

FIG. 1 is a block diagram illustrative of a content delivery environment 100 for the management of resource identifiers. As illustrated in FIG. 1, the content delivery environment 100 includes a number of client computing devices 102 (generally referred to as clients) for requesting content from a content provider and/or a CDN service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances, and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Additionally, the client computing devices 102 may also include necessary hardware and software components to execute, or otherwise process, resource request executable code as will be described in greater detail below. One skilled in the relevant art will appreciate the additional hardware/ software components for processing the resource request executable code may be included with the execution of a multi-purpose software application, such as a browser software application. Alternatively, some or all of the additional hardware/software components may be embodied in stand alone or specialized components configured for the processing the resource request executable code.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence (POP) locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

Although not illustrated in FIG. 1, each client computing device 102 utilizes some type of local DNS resolver component, such as a DNS Name server, that generates the DNS queries attributed to the client computer. In one embodiment, the local DNS resolver component may belong to an enterprise network to which the client computer belongs. In another embodiment, the local DNS resolver component may belong to an Internet Service Provider (ISP) that provides the network connection to the client computer.

With reference now to FIGS. 2-5, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
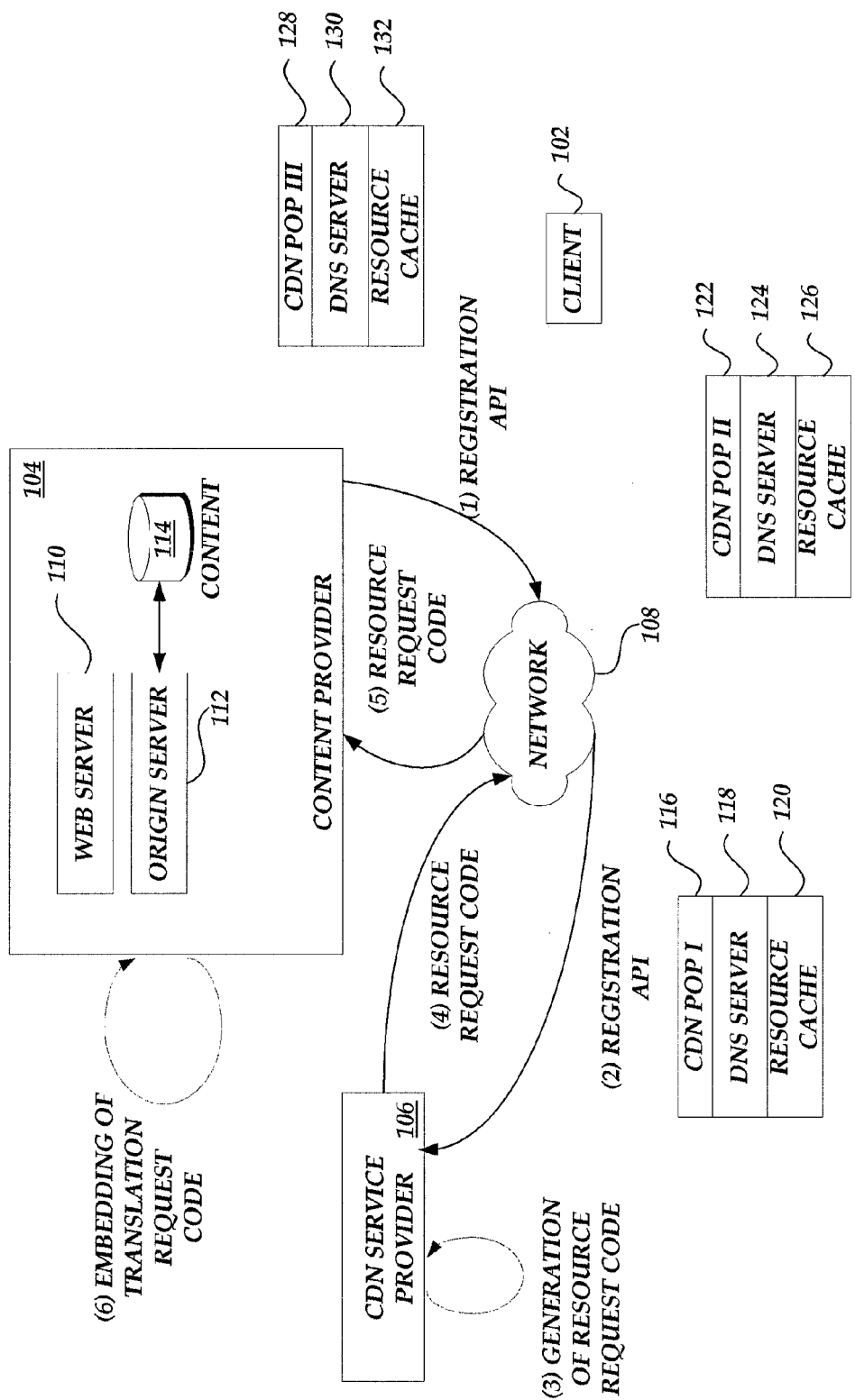
FIG. 2 is a block diagram of the content delivery environment of FIG. 1 illustrating the registration of a content provider with a content delivery network service provider and the generation of resource request executable code.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application programming interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains the registration information and generates, or otherwise obtains, resource request executable code. In an illustrative embodiment, and as will be explained in greater detail below, the resource request executable code corresponds to data or instructions that are processed by the client computing devices 102 to cause the client computing devices 102 to request a list of resources from the CDN service provider 106. Additionally, the resource request executable code can cause the client computing devices 102 to maintain any of the resources requested from the list so that they are available to the client computing device software applications, such as a browser application (at the present or at some time in the future). In an illustrative embodiment, the resource request executable code can correspond to script-based instructions that are processed by a browser software application on the client computing device 102 that causes the browser software application to request the translation information from the CDN service provider 106. One skilled in the relevant art will appreciate, however, the resource request executable code can be embodied in any one of a variety of executable code formats.

The CDN service provider 106 returns the resource request executable code to the content provider 104 along with any additional information. In turn, the content provider 104 can then store for the resource request executable code for embedding in requested content (such as Web page markup language) or otherwise transmitted to the client computing devices 102. In an illustrative embodiment, the resource request executable code can be applicable to multiple content providers 104. Alternatively, the resource request executable code can be unique to each particular content provider 104. Still further, the CDN service provider 106 may provide additional logic to the content providers 104 that controls the circumstances and/or methodologies for embedding the resource request executable code into content. For example, the resource request executable code can include instructions (or executable code) that defines that the type of content (e.g., specific Web pages) for which the resource request executable code will apply.

Figure 3:
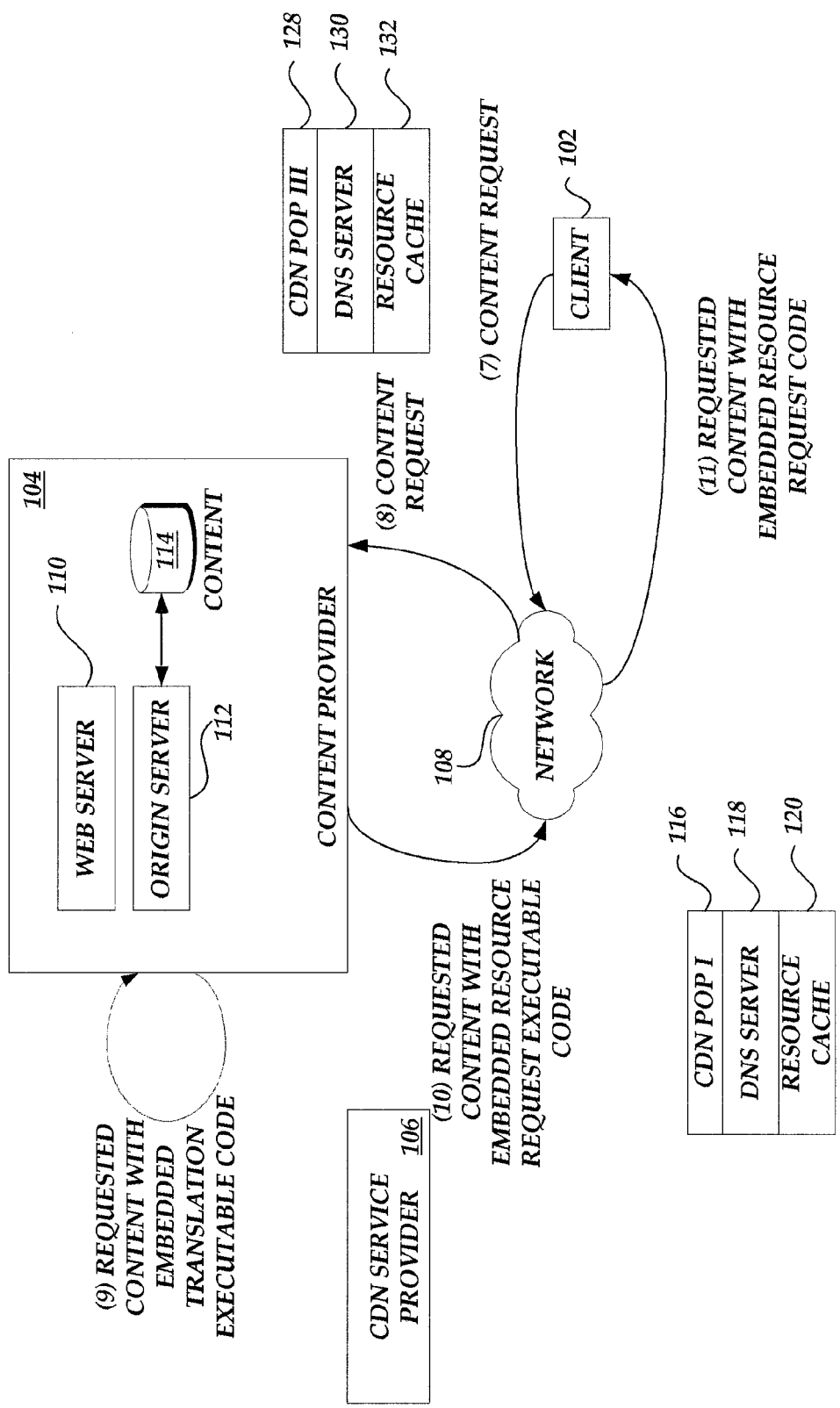
FIG. 3 is a block diagram of the content delivery environment of FIG. 1 illustrating the generation and processing of a content request from a client computing device to a content provider.

With reference now to FIG. 3, after completion of the registration and embedding processes illustrated in FIG. 2, a client computing device 102 generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that corresponds to resource objects that should be obtained by the client computing device 102 as part of the processing of the requested content. Generally, the identification of the resources provided by the content provider 104 will be in the form of a resource identifier that can be processed by the client computing device 102, such as through a browser software application. In an illustrative embodiment, the resource identifiers can be in the form of a uniform resource locator ("URL"). Additionally, the requested content will also include the embedded resource request executable code previously provided by the CDN service provider 106. In an illustrative embodiment, the embedded execution code can be arranged in a manner such that it is processed prior to processing any other of the content in the requested content or processed in the earlier stages of the processing of the requested content, as allowed. Alternatively, the embedded execution code can also be arranged such that it can be parsed by the client computing device 102 from the other requested content.

Figure 4:
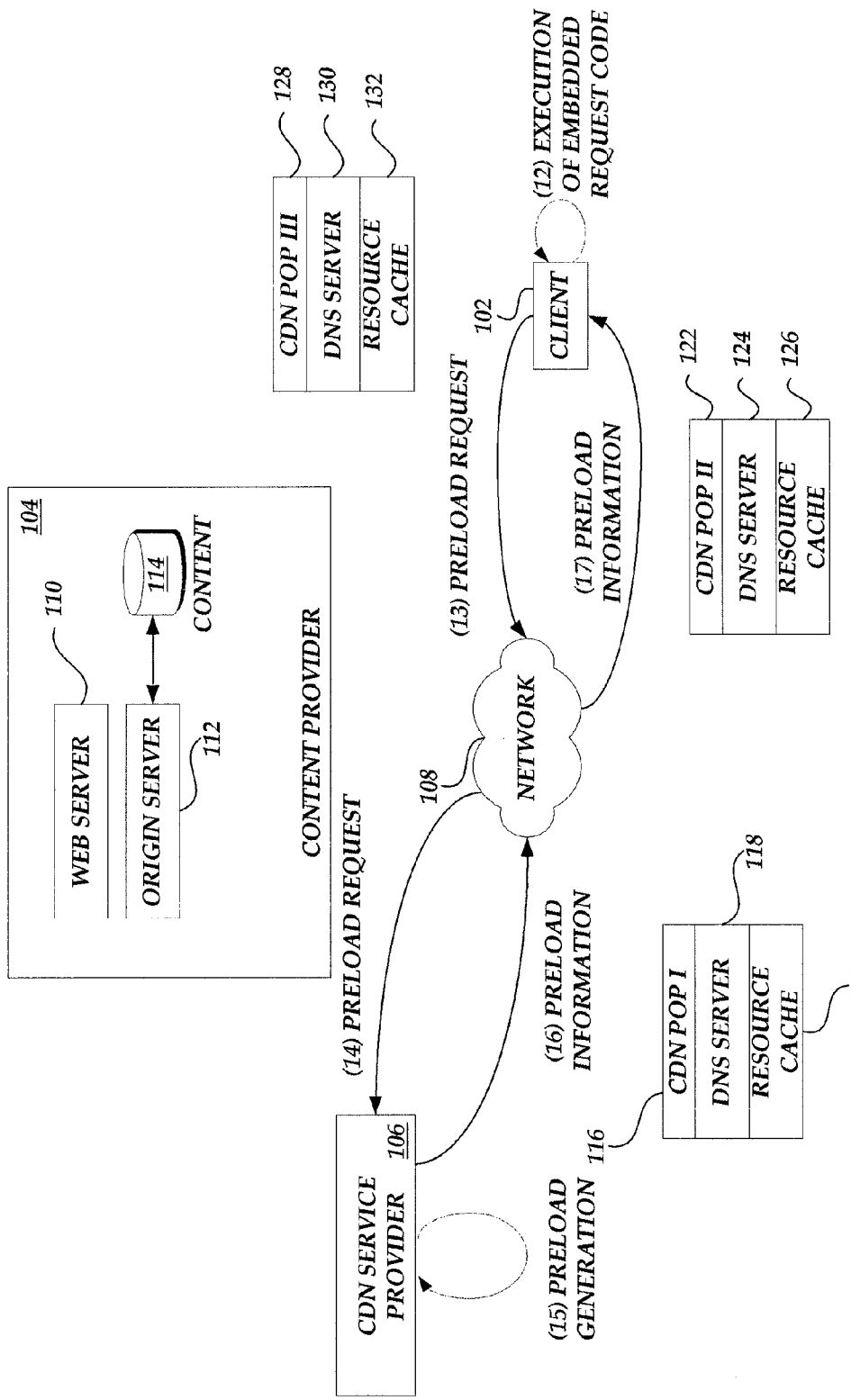
FIG. 4 is a block diagram of the content delivery environment of FIG. 1 illustrating the generation and processing a resource request executable code, by a client computing device, to generate requests for preload information to a content delivery network service provider.

With reference now to FIG. 4, upon receipt of the requested content, including the embedded resource identifiers and the resource request executable code, the client computing device 102 processes the resource request executable code in a manner that causes the client computing device 102 to request preload information or a listing of resources that may be preloaded from the CDN service provider 106. As described above, the resource request executable code can include script-based instructions and information that instructs a browser software application on the client computing device 102 to generate the request for preload information. The preload information request can include information identifying the content provider 104, the specific client computing device 102, the type/size of requested content (e.g. large image files), and additional information that could be used by the CDN service provider 106 to determine a list of resources to be downloaded by the client computing device.

In an illustrative embodiment, the CDN service provider 106 utilizes information corresponding to the monitoring of previous client computing device requests to the resource cache components of the CDN service provider 106 in generating the preload list. The CDN service provider 106 can further use class or clustering information in selecting the resources identified in the list of resources. Although the preload request is illustrated in FIG. 4 as directed toward the CDN service provider 106 in general, one skilled in the relevant art will appreciate that the preload request from the client computing device may be directed toward a specific POP or set of POPs provided by the CDN service provider 106. The selection of appropriate recipients can be based on a variety of factors, including, but not limited to, network topology, service level agreements, geography, and the like.

Upon receipt of the translation information request, the CDN service provider 106, such as through a POP 116, generates preload information that will be used to request additional resources by the client computing device. The preload information can also include rules or other information that specifies the applicability of the resources to be requested, additional instructions regarding the resources once they have been received, expiration timeframes for the preload information, filtering information for the return resource list, and the like. The preload information is then returned to the requesting client computing device 102. In an illustrative embodiment, the client computing device 102 can request the resources identified in the preload information, as described below, if the resource has not been previously stored in a storage location at the client computing device 102, such as a memory. Alternatively, if the resource has been previously stored, the client computing device may manipulate the resource, such as by moving the resource from one storage location (e.g., hard disk) to another storage location (e.g., memory). Still further, the client computing device 102 may manipulate storage controls, such as a cache control, to ensure that content previously stored by the client computing device 102 remains available. Still further, in another embodiment, the preload list can include some portion of the content to be requested/maintained by the client computing device 102.

Figure 5:
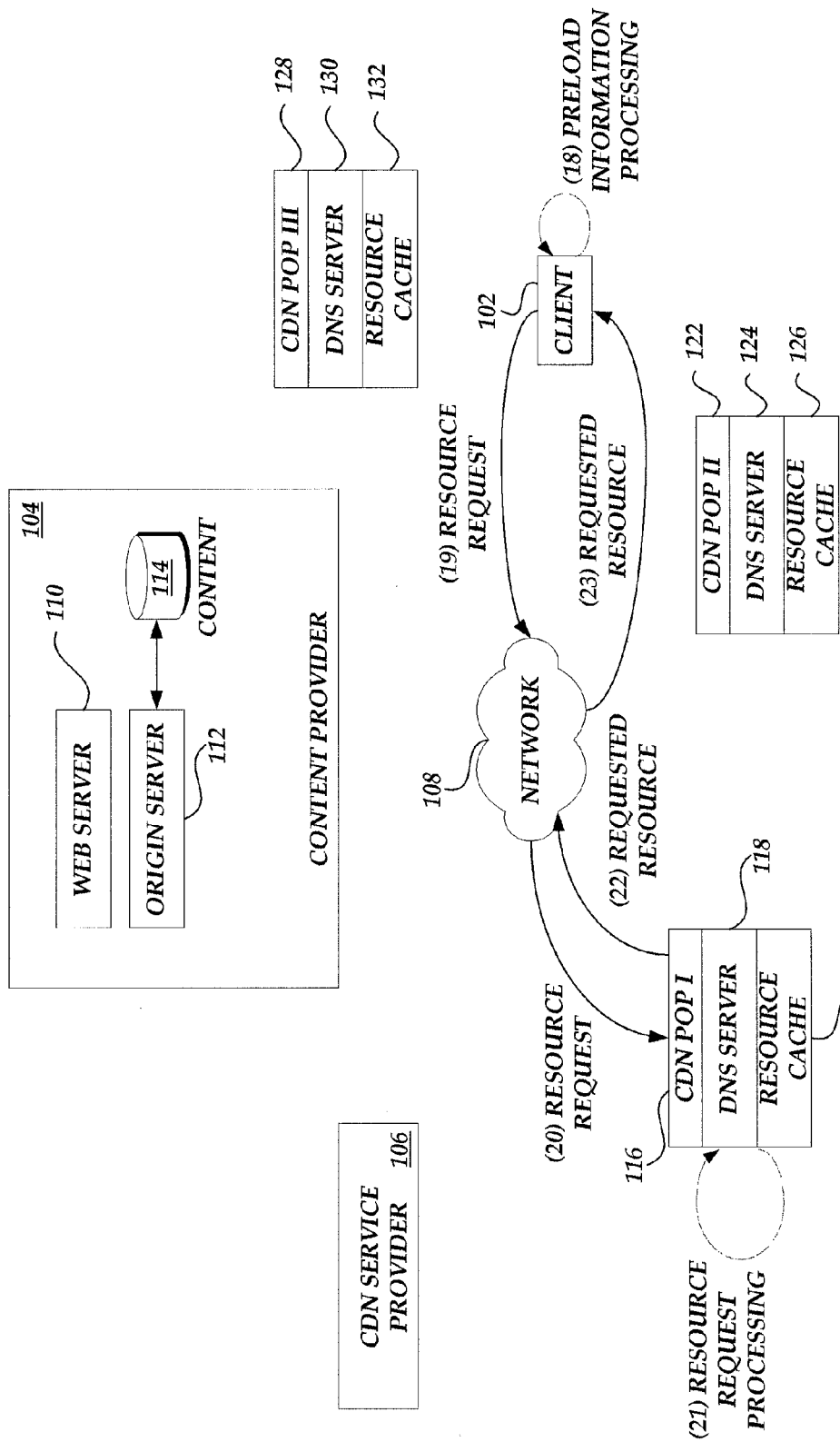
FIG. 5 is a block diagram of the content delivery environment of FIG. 1 illustrating the generation and processing of resource requests from a client computing device, according to preload information.

With reference now to FIG. 5, an embodiment in which at least one resource on the preload list has not been previously downloaded will be described. The client computing device 102 receives and processes the preload information from the CDN service provider 106. In one embodiment, the preload information can include data, or other information, that is processed by code existing on the client computing device 102 in a manner as will be described below. For example, the client computing device 102 may be executing a software application configured specifically for the processing of the preload information. Similarly, the resource request executable code previously executed by the client computing device 102 may include executable instructions for processing the preload information and/or the requested resources once they are received by the client computing device 102. For example, the resource request executable code can specify or instruct a browser application to store the received resources in a storage location, such as memory. The stored resources would then be available for use by the browser application. One skilled in the relevant art will appreciate that the resource request transmitted by the client computing device 102 to the CDN service provider 106 could be processed by a particular POP or set of POPs provided by the CDN service provider 106.

As described above, in an illustrative embodiment, the resources identified by the CDN service provider 106 in the preload information correspond to resources from previously serviced resource requests serviced by the CDN service provider. In one example, the previously serviced resource requests correspond to resource requests previously submitted by the specific client computing device 102. In another example, the previously serviced resource requests correspond to resource requests previously submitted by a cluster or class of a set of computing devices. In still a further example, the previously serviced resource requests corresponds to resource request previously submitted by a cluster or class of a set of computing devices that match or correlate to a cluster or class associated with the client computing device. With additional processing, the preload information can include resources identified in accordance with the above techniques.

Figure 6:
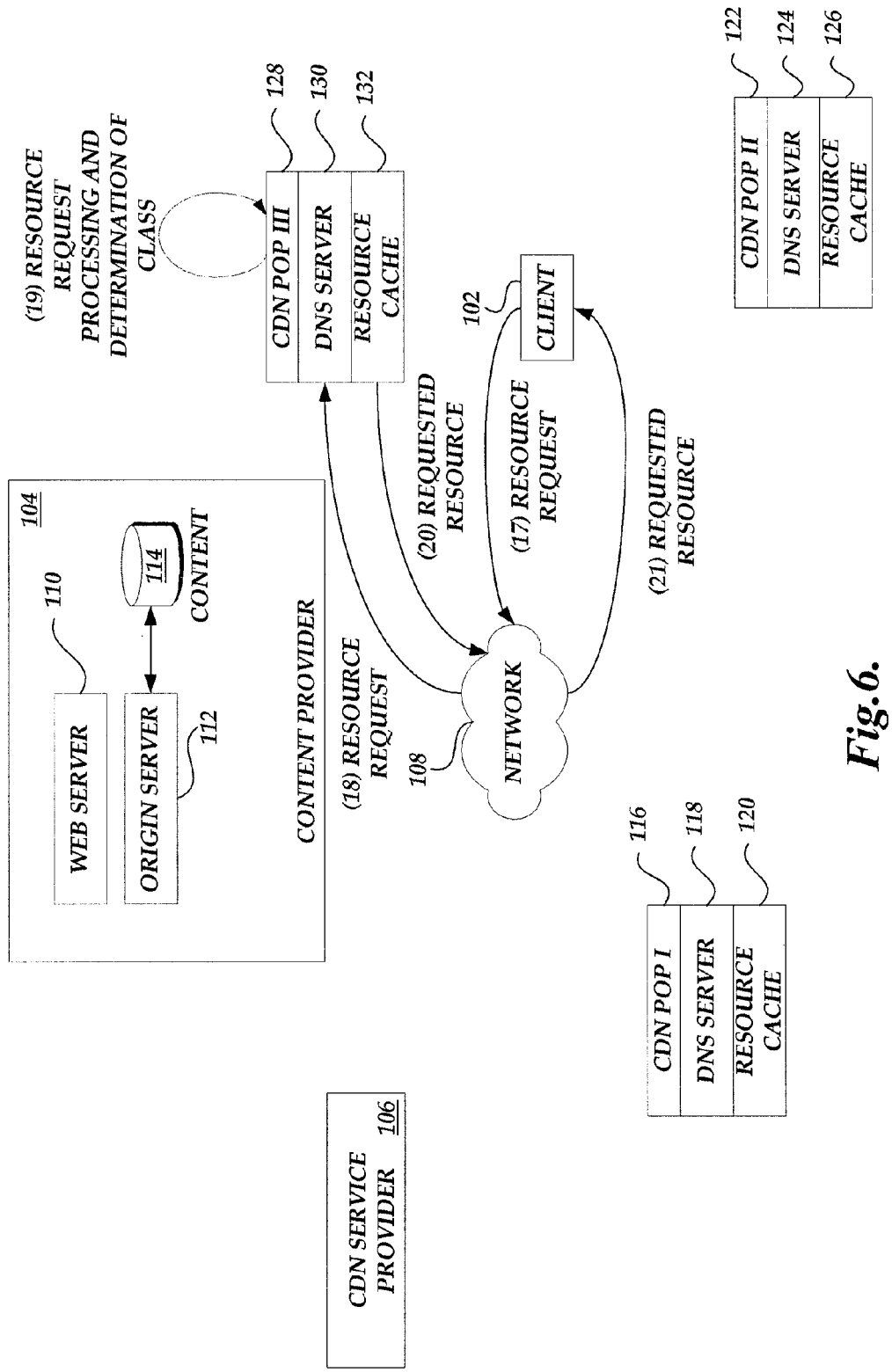
FIG. 6 is a block diagram of the content delivery environment of FIG. 1 illustrating the processing and management of associated class information collected by a resource cache component.

With reference now to FIG. 6, an illustrative embodiment of how the CDN service provider 106 processes and manages associated class information collected by the resource cache component 132 will be described. The resource cache component 132 provides the associated class information collected at the POP 128 to the CDN service provider 106. The associated class information can then be processed by the CDN service provider 106 in a number of ways. In one embodiment, the CDN service provider 106 can identify content information for providing to a requesting client computing device 102 based, at least in part, on the associated class information. Alternatively, as previously described, the identified content information can include the frequently requested content itself.

Referring to FIG. 6, a resource cache component, such as resource cache component 132 of POP 128, utilizes information received from previous client computing device requests to associate class information to the resource requests. The class can be determined from the client directly (such as information provided by the client computing device or ISP) or indirectly (such as inferred through a client computing device's IP address). Additionally, the resource cache component can use additional information to determine the class, such as a temporal domain (e.g., a time zone) in which the requesting client computing device 102 is located. The resource cache component associates the class information with the requested content and maintains the associated class information, for example in a log file, for sharing with the CDN service provider 106.

In an illustrative embodiment, the determination of class can be statically determined based on predefined class definitions so that the association of the class can be done at the time of receiving resource requests. For example, a geographic location may be known at the time of request processing. In another embodiment, the determination of class can be dynamic and may not be determined (or determinable) at request processing. For example, behavioral classes based on observing behavior over a time window may not be determined until completion of the observation window's processing of the observed data.

In one illustrative embodiment, the class can correspond to a specific geographic region to which the client computing device belongs. In addition or alternatively, the class can correspond to temporal domain, e.g., time zone, business hours, daytime/nighttime, holidays, and the like. In another embodiment, the class can correspond to a particular subject area, such as a news group, associated with either the requested content or the user or both. Still further the class can correspond to demographic data. Depending on the information to be collected from the requesting client computing device, the resource cache component can determine and maintain this information in a number of ways as will be appreciated by one skilled in the relevant art. Moreover, it will further be appreciated by one skilled in the relevant art that one or more computing devices at the POP where the resource request is received can perform any of the above described functions.

Based on the above description of class or cluster information, CDN service provider 106 can match or correlate a class of a requesting client computing device 102 (FIG. 4) with a class associated with the resources in determining whether to include such resources in the preload list. For example, the CDN provider 106 may match a topic of interest class, such as basketball scores, with resources that have been associated with the same class based on previous requests. The class of the client computing device 102 may be obtained through a user profile of a user associated with the client computing device and/or through subject matter associated with the content request submitted by the client computing device.

Alternatively, the function can involve a correlation determination in which the CDN service provider correlates a class of the requesting client computing device 102 with a different class associated with the resources. For example, the CDN service provider 106 may correlate a first geographic class, such as New York City, with another geographic class, such as San Francisco. In this case, the CDN service provider 106 would make some associations regarding the New York City geographic class is sufficiently similar to the San Francisco class to merit an association. In an illustrative embodiment, determination of matching or correlation may be facilitated through a manual process, such as by an, administrator, or based on observed behaviors.

With reference now to FIG. 7, a resource identifier processing routine 700 implemented by a client computing device 102 to process embedded resource identifiers with translation information will be described. At block 702, client computing device 102 transmits the request for content. As described above, the request for content may be directed to a Web server 110 of the content provider 104. At block 704, the client computing device 102 obtains responsive content that includes resource request executable code. As described above, in an illustrative embodiment, the resource request executable code can correspond to script-based instructions that can be processed by a software application running on the client computing device 102.

At block 706, the client computing device 102 transmits the request for preload information to the CDN service provider 106 identified in the resource request executable code. As previously described, the request for preload information can include information that may be used by the CDN service provider 106 to generate, or select, the translation information. The additional information may be specifically included in the request for translation or inferred from aspects of the request (e.g., IP address of the client computing device 102). The CDN service provider 106 can utilize class information or clustering information to select the resources that will be included in the preload information. The utilization of such class or cluster information facilitates the identification of resources that may not have any relation to the current set of resources to be displayed by the client computing device 102. At block 708, the client computing device 102 obtains resource information from the CDN service provider 106.

At block 710, the client computing device 102 processes the resource identifiers, or other information, with the preload information. In a further illustrative embodiment, the client computing device 102 can maintain a history of whether previous resource requests for content based on a preload list provided by the CDN provider 106 were utilized. Accordingly, the client computing device 102 can provide some additional filtering or processing based on the history. For example, if the CDN provider 106 provides selects content according to subject matter class, the client computing device 102 may filter this type of content to prevent that content from being preloaded. The filtering may be manually configured or configured by executable code on the client computing device 102 monitoring the preload requests. Additionally, the client computing device 102 can provide feedback to the CDN service provider 106 for adjustments to the preload matching algorithms or methodologies. It will be appreciated by one skilled in the relevant art that a variety of logic may be implemented to monitor such behavior and to update recommendations based thereon.

At block 712, the client computing device 102 transmits requests for the resources associated with the resource identifiers. In an illustrative embodiment, the request for the resources associated with the translated URLs can be facilitated through various networking protocols. As set forth above, in an alternative embodiment, there are a number of ways to manage the identified set of content, e.g., preloading the content at the client computing device 102, verifying availability of content, managing cache control information related to content in memory (e.g., changing expiration data or manipulating expiration variables), and the like. Accordingly, the processing for content at block 712 may be omitted or otherwise managed differently if the identified content is already in a client computing device memory. At block 714, the routine 700 terminates.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for processing content at a client computing device, the method comprising:
   obtaining a set of content for processing on the client computing device, wherein the set of content includes executable code for causing the client computing device to generate a request to an identified service provider for a preload content list;
   generating, at the client computing device, a request for the preload content list responsive to the execution of the executable code;
   obtaining, from the identified service provider, the requested preload content list, wherein resources identified in the requested preload content list are unrelated at least in part to the set of content;
   filtering, at the client computing device, the requested preload content list to identify a subset of resources from the requested preload content list; and
   generating, at the client computing device, a request for preloading one or more of the subset of resources identified in the filtered preload content list at the client computing device;
   wherein the method is implemented by the client computing device configured with specific executable instructions.

2. The computer-implemented method as recited in claim 1 further comprising:
   obtaining the one or more of the subset of resources from the filtered preload content list; and
   maintaining the one or more of the subset of resources for subsequent use.

3. The computer-implemented method as recited in claim 1, wherein the executable code includes code for identifying additional information associated with the client computing device and wherein the request for the preload content list includes the additional information.

4. The computer-implemented method as recited in claim 3, wherein the requested preload content list is associated with the additional information.

5. The computer-implemented method as recited in claim 1, wherein the resources identified in the requested preload content list include resources from previous content requests serviced by one or more cache components of the identified service provider.

6. The computer-implemented method as recited in claim 1, wherein the requested preload content list is filtered by the type or size of content.

7. The computer-implemented method as recited in claim 1, wherein the executable code further comprises executable instructions for processing the filtered preload content list at the client computing device.

8. The computer-implemented method as recited in claim 7, wherein the executable instructions for processing the filtered preload content list at the client computing device comprise instructions for managing storage controls at the client computing device for maintaining content both identified in the filtered preload content list and already stored at the client computing device.

9. A computer-implemented method for processing content at a service provider, the method comprising:
under control of one or more computing devices associated with the service provider and configured with specific executable instructions,
obtaining a request, from a client computing device, for a resource and a preload content list;
determining a set of content for identification in the requested preload content list, wherein at least a portion of the set of content identified in the requested preload content list is unrelated to the requested resource;
filtering the determined set of content based on additional information provided by the client computing device to identify a filtered preload content list; and
causing transmission of the filtered preload content list to the client computing device.

10. The computer-implemented method as recited in claim 9 further comprising obtaining the additional information provided by the client computing device with the request for the preload content list, wherein the set of content identified in the filtered preload content list is determined based on the additional information.

11. The computer-implemented method as recited in claim 10, wherein the additional information is behavioral information corresponding to the client computing device.

12. The computer-implemented method as recited in claim 9, wherein determining the set of content for identification in the requested preload content list further comprises determining the set of content for identification in the requested preload content list based on previously requested content provided by one or more cache components of the service provider.

13. The computer-implemented method as recited in claim 9, wherein determining the set of content for identification in the requested preload content list includes determining the set of content for identification in the requested preload content list based on previous content requests from a class associated with a set of client computing devices.

14. The computer-implemented method as recited in claim 9, wherein determining the set of content for identification in the requested preload content list includes determining the set of content for identification in the requested preload content list based on previous content requests from a class associated with the client computing device.

15. The computer-implemented method as recited in claim 9 further comprising obtaining, at the service provider, a request from the client computing device to preload content identified on the filtered preload content list at the client computing device.

16. A system comprising:
a client computing device having specific executable instructions stored in an associated memory and operative to:
obtain a set of content for processing on the client computing device, wherein the set of content includes executable code for causing the client computing device to generate a request to an identified service provider for a preload content list;
generate, at the client computing device, a request for the preload content list responsive to the execution of the executable code;
obtain, from the identified service provider, the requested preload content list, wherein resources identified in the requested preload content list are unrelated at least in part to the set of content;
filter, at the client computing device, the requested preload content list to identify a subset of resources from the requested preload content list; and
generate, at the client computing device, a request for preloading one or more of the subset of resources identified in the filtered preload content list at the client computing device.

17. The system as recited in claim 16 further comprising:
obtaining the one or more of the subset of resources from the filtered preload content list; and
maintaining the one or more of the subset of resources for subsequent use.

18. The system as recited in claim 16, wherein the executable code includes code for identifying additional information associated with the client computing device and wherein the request for the preload content list includes the additional information.

19. The system as recited in claim 16, wherein the resources identified in the requested preload content list include resources from previous content requests serviced by one or more cache components of the identified service provider.

20. A system comprising:
a service provider computing device having specific executable instructions stored in an associated memory and operative to:
obtain a request, from a client computing device, for a resource and a preload content list;
determine a set of content for identification in the requested preload content list, wherein at least a portion of the set of content identified in the requested preload content list is unrelated to the requested resource;
filter the determined set of content based on additional information provided by the client computing device to identify a filtered preload content list; and
cause transmission of the filtered preload content list to the client computing device.

21. The system as recited in claim 20, wherein the service provider computing device is further operative to obtain the additional information provided by the client computing device with the request for the preload content list, wherein the set of content identified in the filtered preload content list is determined based on the additional information.

22. The system as recited in claim 20, wherein determining the set of content for identification in the requested preload content list further comprises determining the set of content for identification in the requested preload content list based on previously requested content provided by one or more cache components of the service provider.

23. The system as recited in claim 20, wherein determining the set of content for identification in the requested preload content list includes determining the set of content for identification in the requested preload content list based on previous content requests from a class associated with a set of client computing devices.

24. The system as recited in claim 20, wherein determining the set of content for identification in the requested preload content list includes determining the set of content for identification in the requested preload content list based on previous content requests from a class associated with the client computing device.

25. The system as recited in claim 20, wherein the service provider computing device is further operative to obtain, at the service provider, a request from the client computing device to preload content identified on the filtered preload content list at the client computing device.

* * * * *